United States Patent [19]
Dionysian

[11] Patent Number: 6,026,188
[45] Date of Patent: Feb. 15, 2000

[54] SYSTEM AND METHOD FOR RECOGNIZING A 3-D OBJECT BY GENERATING A ROTATED 2-D IMAGE OF THE OBJECT FROM A SET OF 2-D ENROLLMENT IMAGES

[75] Inventor: Raffi Dionysian, Laguna Hills, Calif.

[73] Assignee: Unisys Corporation, Blue Bell, Pa.

[21] Appl. No.: 08/947,479

[22] Filed: Oct. 10, 1997

[51] Int. Cl.[7] .............................. G06K 9/00; G06K 9/62; H04N 7/18
[52] U.S. Cl. ........................ 382/216; 382/115; 382/118; 382/209; 348/139; 348/143
[58] Field of Search .................................. 382/115, 118, 382/169, 209, 216; 250/334; 345/427; 348/164, 50, 143, 139

[56] References Cited

U.S. PATENT DOCUMENTS

| | | | |
|---|---|---|---|
| 4,449,189 | 5/1984 | Feix et al. | 382/118 |
| 4,658,428 | 4/1987 | Bedros et al. | 382/216 |
| 4,712,103 | 12/1987 | Gotanda | 382/118 |
| 4,975,969 | 12/1990 | Tal | 382/118 |
| 5,163,094 | 11/1992 | Prokoski et al. | 382/118 |
| 5,164,992 | 11/1992 | Turk et al. | 382/118 |
| 5,410,609 | 4/1995 | Kado et al. | 382/118 |
| 5,432,864 | 7/1995 | Lu et al. | 382/118 |
| 5,608,387 | 3/1997 | Davies | 382/118 |
| 5,692,115 | 11/1997 | Itoh et al. | 345/427 |

OTHER PUBLICATIONS

Liao, et al "Determining Pose in Multiple–View Based 3–D Object Recognition System", IEEE, 1991.

Chellappa, et al "Human and Machine Recognition of Faces: a Survey", IEEE, 1995.

Beymer, et al "Face Recognition from One Example View", IEEE, 1995.

*Primary Examiner*—Leo H. Boudreau
*Assistant Examiner*—Daniel G. Mariam
*Attorney, Agent, or Firm*—Charles J. Fassbender; Mark T. Starr; Steven B. Samuels

[57] ABSTRACT

A three-dimensional object X is recognized by a method which includes the steps of: a) storing in a memory, a set of two-dimensional enrollment images $X_1$–$X_n$ of the object X as viewed from n different directions; b) acquiring a two-dimensional access image of an unidentified object as viewed from a new direction which lies between the n different directions; c) generating, from the stored set of images, a rotated two-dimensional image of the object X as viewed from a direction which is closer to the new direction than any of the n different directions; and, d) identifying the unidentified object as the object X only if a correlation between the image of the unidentified object and the rotated image exceeds a predetermined threshold. By generating the rotated image, misalignments with the access image of the unidentified object are reduced; and thus the predetermined threshold can be raised to reduce recognition errors.

16 Claims, 5 Drawing Sheets

Eq. 1 → $\alpha_1 = \dfrac{d_{iB} - d_{1B}}{d_{2B} - d_{1B}}$   Eq. 2 → $\alpha_2 = \dfrac{d_{iA} - d_{1A}}{d_{2A} - d_{1A}}$ Eq. 3 → $L1 = L1_{MAX}(\alpha_1)$ Eq. 4 → $L2 = L2_{MAX} - (L2_{MAX} - L2_{MIN})(\alpha_2)$ Eq. 5 → $L = (1-\alpha_1)(1-\alpha_2)L_{X1} + \alpha_1(1-\alpha_2)L_{X2} + (1-\alpha_1)(\alpha_2)L_{X4} + (\alpha_1)(\alpha_2)L_{X7}$
  ↑ 41    ↑ 42    ↑ 43    ↑ 44

Eq. 6 → $L = (1-\alpha_1-\alpha_2)L_{X1} + \alpha_1 L_{X2} + \alpha_2 L_{X4}$
  ↑ 51    ↑ 52   ↑ 53

SYSTEM AND METHOD FOR RECOGNIZING A 3-D OBJECT BY GENERATING A ROTATED 2-D IMAGE OF THE OBJECT FROM A SET OF 2-D ENROLLMENT IMAGES

BACKGROUND OF THE INVENTION

This invention relates to electronic systems for recognizing three-dimensional objects, such as the face of a person; and it relates to the methods by which such systems operate.

One field of use for electronic recognition systems is in the area of security. For example, a person can either be granted access or denied access to a secure area based on whether or not an image of the person's face is electronically recognized by the system. Also, another field of use for electronic recognition systems is in the area of industrial manufacturing. For example, various components which make a product can be selected or rejected by a robotic arm based on whether or not an image of the component is recognized by the system.

In all of the above applications, a key task which needs to be performed as part of the recognition process is that two images must be correlated. One such image is the image of the unknown object which the system is trying to recognize (herein called the access image), and the other image is of the known object which the system uses as a reference (herein called the enrollment image). If the correlation between the access image and the enrollment image exceeds a predetermined threshold value, then the unknown object is recognized.

However, a problem which hinders the correlation step is that a certain degree of misalignment almost always occurs between the access image and the enrollment image. This misalignment occurs because in an operating environment it is impractical to align the known and unknown objects to a camera with exactly the same angles on many different occasions.

As the misalignment between the access image and the enrollment image increases, the correlation between those two images decreases. Consequently, the threshold value to which the correlation is compared, must be lowered in order to recognize an object that is misaligned. However, this presents a dilemma because when the threshold value is lowered, then the probability is increased that the threshold will be exceeded by an object which should not be recognized.

This problem occurs, for example, in the prior art electronic recognition system by Prokoski, et al., which is described in U.S. Pat. No. 5,163,094. In patent '094, an individual who is seeking access through a controlled check point must stop at the entry door and "position himself" relative to a thermal image sensor camera so that a thermal image of his face can be obtained. From that image, a "faceball" is generated; and then an "elemental shape" on a reference faceball is correlated across an area of the currently generated faceball. See patent '094 at column 7, lines 33–37 and lines 46–50.

However, in making this correlation, the area of the currently generated faceball which is correlated to the reference elemental shape must be made large enough to enclose all possible transpositions "which could occur due to twisting, tilting, or tipping of either faceball relative to the other." This is explained in patent '094 at column 7, lines 51–55.

Such twisting, tilting, or tipping of either faceball relative to the other will lessen their degree of correlation. Thus the threshold value for the correlation must be reduced, from what it could be if such twisting, tilting, or tipping did not occur. But, reducing the threshold value increases the probability of the threshold being met by another person who should not be recognized.

Accordingly, a primary object of the present invention is to provide an electronic recognition system in which the above problem is overcome.

BRIEF SUMMARY OF THE INVENTION

In accordance with the present invention, a three-dimensional object X is recognized by a method which includes the steps of: a) storing in a memory, a set of two-dimensional enrollment images $X_1$–$X_n$ of the object X as viewed from n different directions; b) acquiring a two-dimensional access image of an unidentified object as viewed from a new direction which lies between the n different directions; c) generating, from the stored set of images, a rotated two-dimensional image of the object X as viewed from a direction which is closer to the new direction than any of the n different directions; and, d) identifying the unidentified object as the object X only if a correlation between the image of the unidentified object and the rotated image exceeds a predetermined threshold.

A primary feature of the above method is that the rotated image has a higher correlation to the access image than any of the enrollment images which are initially stored in the system. Since the correlation between the rotated image and the access image is larger than the correlation between the access image and any of the enrollment images, the threshold value which must be exceeded in order to recognize an object can be raised; and that in turn reduces the rate with which objects are erroneously recognized. Conversely, if the threshold value is lowered, then the probability of the threshold being exceeded by an object which should not be recognized is increased.

DETAILED DESCRIPTION

Figure 1:
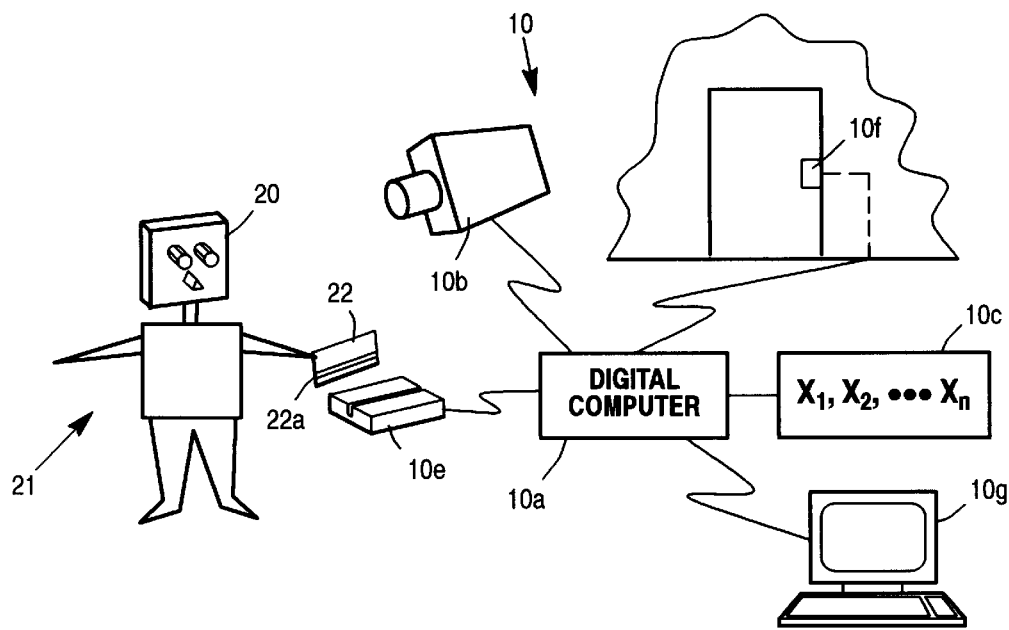
FIG. 1 shows an electronic system which constitutes one preferred embodiment of the present invention.
Figure 1:
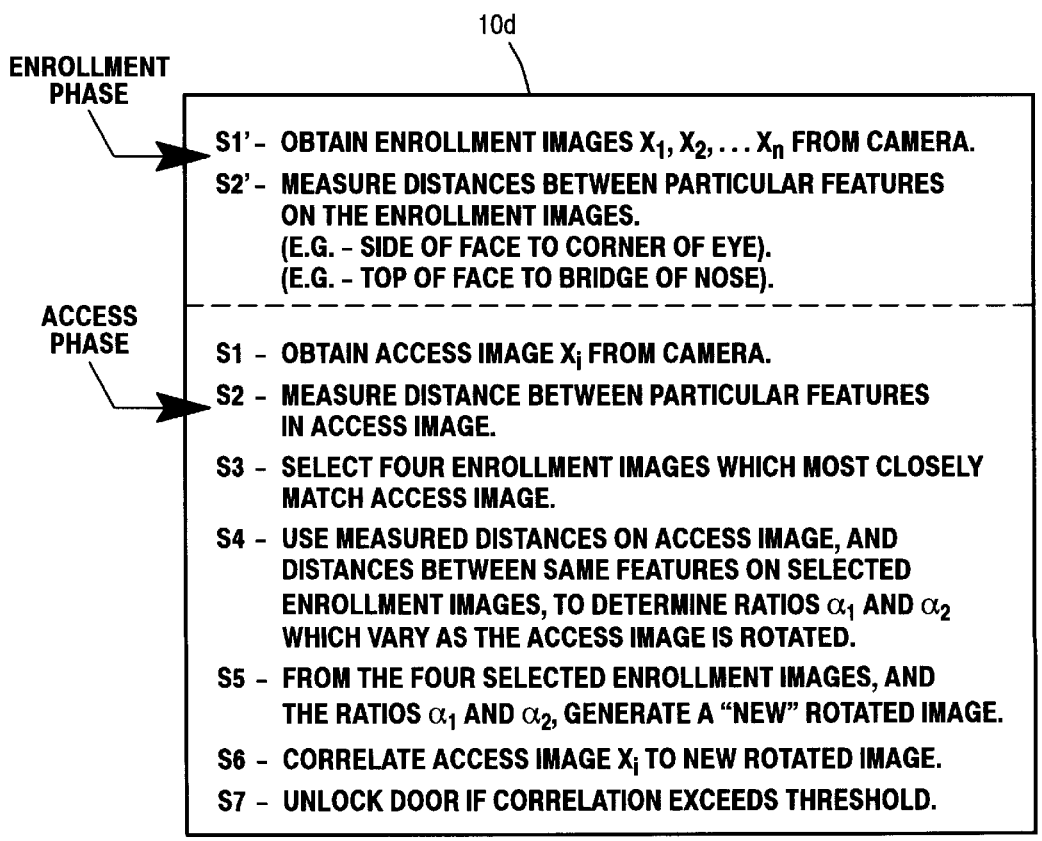

In FIG. 1, an electronic system 10 is shown which constitutes one preferred embodiment of the present invention. This electronic system 10 includes a digital computer 10a, a camera 10b, a memory 10c which stores images from the camera, a memory 10d which stores a computer program, a magnetic stripe reader 10e, an electromechanical lock 10f, and an operator's console 10g. Each of the items 10b–10g is coupled to the digital computer 10a as shown.

In operation, the electronic system 10 recognizes the face 20 of a person 21. To recognize the person's face 20, the computer program in the memory 10d performs a process which has an enrollment phase and an access phase. Steps S1'–S2' of this program constitute the enrollment phase; and steps S1–S7 of this program constitute the access phase.

By step S1', a set of two-dimensional digital images $X_1$–$X_n$ of the person's face 20 which is to be recognized is received from the camera 10 and stored in the memory 10c. These images $X_1$–$X_n$ are called the enrollment images, and they show the person's face 20 as viewed from n different directions.

Each enrollment image is entered into the memory 10c by the operator (not shown) of the console 10g. This operator instructs the person 21 to stand a predetermined distance from the camera 10 and look in n different directions. For each such direction, the operator enters commands via the console 10g which causes the computer 10c to store an image in the memory 10c.

Figure 2:
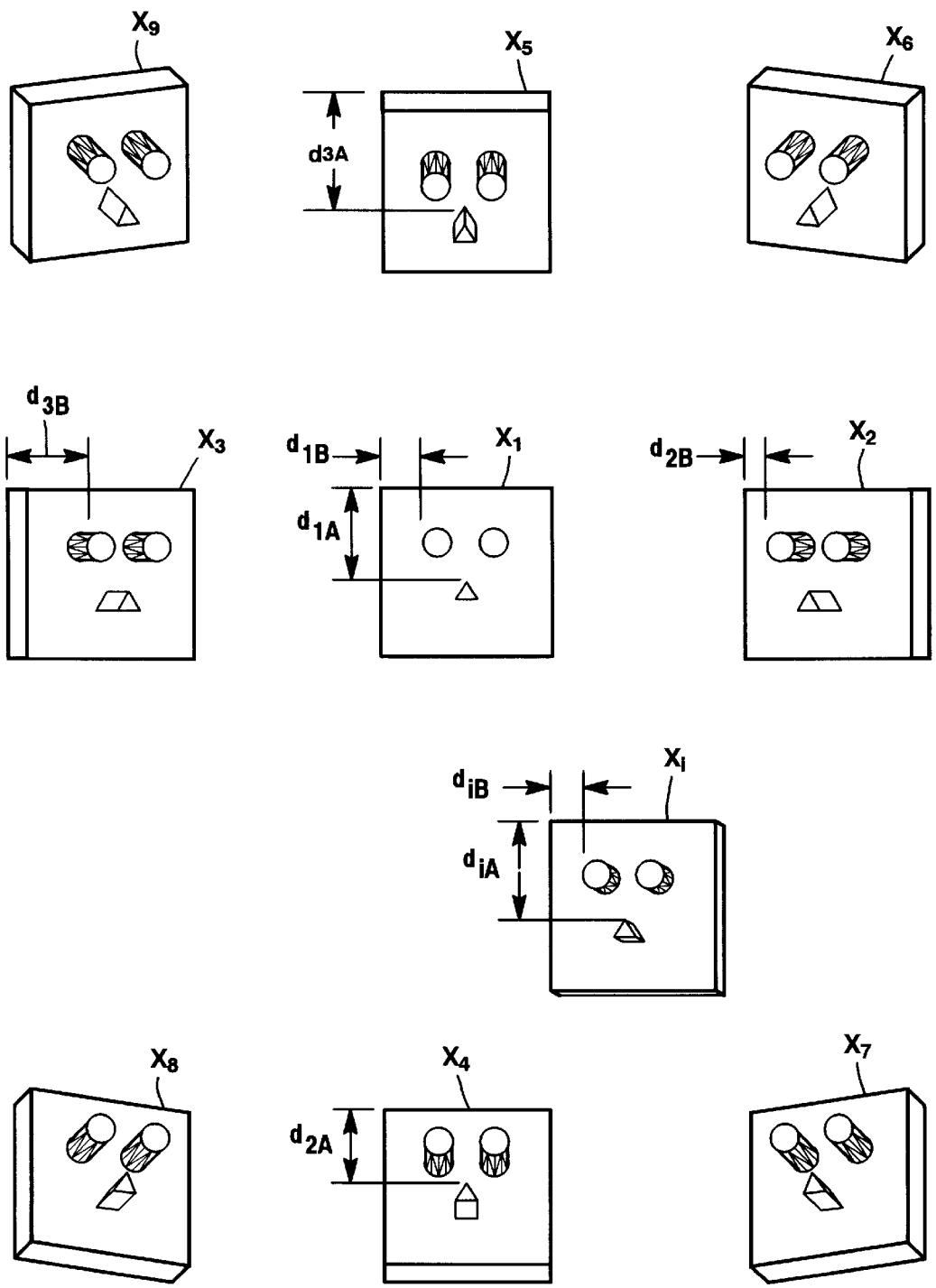
FIG. 2 show a set of enrollment images $X_1$–$X_n$ which are stored in a memory in the FIG. 1 system, as well as an access image $X_i$ which the FIG. 1 system is trying to recognize.

An example of the images $X_1$–$X_n$ which are stored by step S1' is shown in FIG. 2. In the FIG. 2 example, the total number of images which are stored in the memory 10c is nine; and those images $X_1$–$X_9$ show the face 20 as viewed from respective directions which differ by 20°.

Image $X_1$ shows the face 20 when it is looking directly into the camera 10b. By comparison, image $X_2$ shows the face 20 when it is turned 20° to the person's right; image $X_3$ shows the face 20 when it is turned 20° to the person's left; image $X_4$ shows the face 20 when it is tilted 20° up; and image $X_5$ shows the face 20 when it is tilted 20° down. All of the remaining images $X_6$–$X_9$ show the face 20 when it is both turned and tilted 20°. Each image $X_1$–$X_9$, and the direction from which it is viewed, is listed below in TABLE I.

TABLE I

|  | degrees up | degrees right |
|---|---|---|
| $X_1$ | 0 | 0 |
| $X_2$ | 0 | 20 |
| $X_3$ | 0 | −20 |
| $X_4$ | 20 | 0 |
| $X_5$ | −20 | 0 |
| $X_6$ | −20 | 20 |
| $X_7$ | 20 | 20 |
| $X_8$ | 20 | −20 |
| $X_9$ | −20 | −20 |

Next, by step S2', the distances between certain predetermined features in the enrollment images are measured by the computer 10a. Each distance can be expressed as the number of pixels which occurs between two features. All of these measured distances are then stored in the memory 10c along with the enrollment images.

Preferably, two features between which the distances are measured are the top of the face 20 and the bridge of the nose on the face. These distances are illustrated in FIG. 2 as distance $d_{1A}$ on image $X_1$, distance $d_{2A}$ on image $X_4$, and distance $d_{3A}$ on image $X_5$.

Two other features between which the distances also are preferably measured are the side of the face 20 and the nearest corner of an eye on the face. These distances are illustrated in FIG. 2 as distance $d_{1B}$ on image $X_1$, distance $d_{2B}$ on image $X_2$, and distance $d_{3B}$ on image $X_3$.

For each person who is to be recognized by the FIG. 1 system, the above enrollment steps S1'–S2' are performed one time; and, a personal identification number (PIN) is stored in the memory 10c along with the corresponding set of enrollment images. This PIN is sent to the computer 10a by passing the magnetic stripe 22a of a card 22 through the reader 10e, or by the operator's console 10g.

After the enrollment phase, the access phase can be performed. This access phase occurs each time, the person 21 seeks access to a restricted area which is secured by the electromechanical lock 10f. If the electronic system 10 recognizes the person's face 20 during the access phase, then the computer 10a sends a signal to the lock 10f which causes it to open.

In step S1, a new two-dimensional digital image $X_i$ of the person's face 20 is taken by the camera 10b. This image $X_i$ is called the access image. In the access image, the distance of the person's face from the camera is the same as in his enrollment images. But in the access image, the angle of the person's face 20 relative to the camera 10b will inherently be different from, and lie between, the angles of the person's face in his enrollment images.

An example of the access image $X_i$ which is obtained in step S1 is shown in FIG. 2. In this example, the image $X_i$ shows the face 20 when it is turned 10° to the right and tilted 5° up. This is in comparison to the enrollment image $X_2$ which is turned 20° to the right and the enrollment image $X_4$ which is tilted 20° up.

Also in step S1, the person 21 has his PIN entered via the magnetic stripe reader 10e or the operator's console 10g. This PIN selects the one set of enrollment images $X_1$–$X_9$ which has the same PIN, for use in the subsequent steps of the access phase.

Next, in step S2, distances are measured in the access image $X_i$ between the same features which were used in step S2'. In FIG. 2, distance $d_{iA}$ shows the distance in the access image $X_i$ between the bridge of the nose and the top of the face; and distance $d_{iB}$ shows the distance between the side of the face and the nearest corner of an eye on the face.

Figures 3, 4:
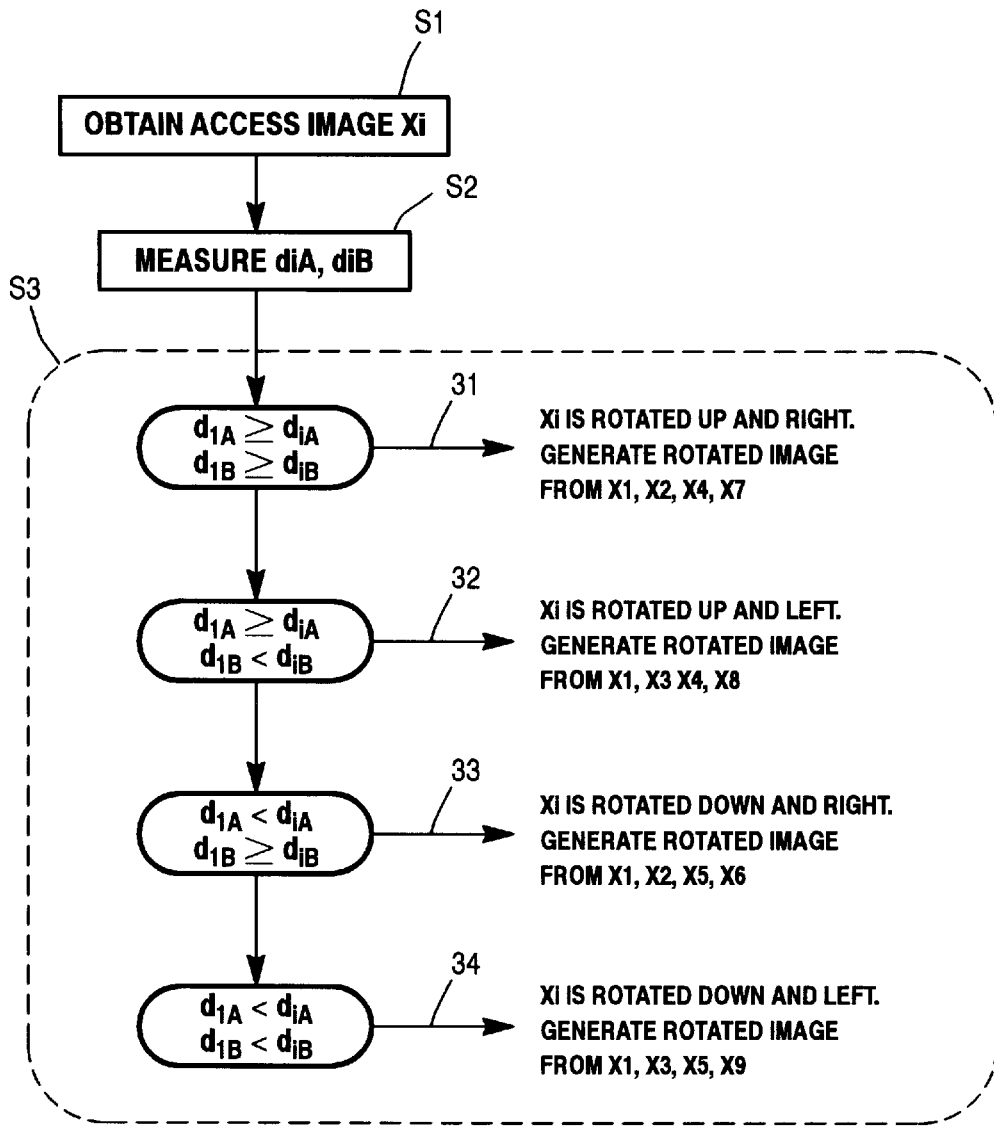
FIG. 3 shows, in detail, a step S3 which is performed by the FIG. 1 system.
FIG. 4 shows two equations which are used in a step S4 that is performed by the FIG. 1 system.

Next, in step S3, four of the enrollment images $X_1$–$X_9$ are selected which most closely match the access image $X_i$. This step S3 is shown in FIG. 3 as being performed by comparing the distances which were measured in step S2 to the distances which were measured in step S2'.

If distance $d_{1A}$ is greater than distance $d_{iA}$ and distance $d_{1B}$ is greater than distance $d_{iB}$, then the access image $X_i$ is rotated up and to the right. Consequently, the four enrollment images which most closely match the access image $X_i$ are the images $X_1$, $X_2$, $X_4$, and $X_7$. This is indicated in FIG. 3 by reference numeral 31.

If distance $d_{1A}$ is greater than distance $d_{iA}$ and distance $d_{1B}$ is less than distance $d_{iB}$, then the access image $X_i$ is rotated up and to the left. For this case, the four enrollment images which most closely match the access image $X_i$ are the images $X_1$, $X_3$, $X_4$, and $X_8$; and this is indicated in FIG. 3 by reference numeral 32.

If distance $d_{1A}$ is less than distance $d_{iA}$ and distance $d_{1B}$ is greater than distance $d_{iB}$, then the access image $X_i$ is rotated down and to the right. Thus, the four enrollment images which most closely match the access image $X_i$ are the images $X_1$, $X_2$, $X_5$, and $X_6$; and this is indicated in FIG. 3 by reference numeral 33.

If distance $d_{1A}$ is less than distance $d_{iA}$ and distance $d_{1B}$ is less than distance $d_{iB}$, then the access image $X_i$ is rotated down and to the left. Thus, the four enrollment images which most closely match the access image $X_i$ are the images $X_1$, $X_3$, $X_5$, and $X_9$; and this is indicated in FIG. 3 by reference numeral 34.

Next, in step S4, the measured distances are used to determine two ratios $\alpha_1$ and $\alpha_2$. Ratio $\alpha 1$ varies from zero to one as the angle by which the access image $X_i$ is rotated to the right increases; and ratio $\alpha_2$ varies from zero to one as the angle by which the access image is rotated upward increases. These two ratios are given by equations 1 and 2 in FIG. 4.

Next, in step S5, the ratios $\alpha_1$ and $\alpha_2$ together with the four enrollment images which were selected in step S3 as most closely matching the access image, are used to generate a new image $X_R$ of the face 20 as viewed from the same direction at which the access image was taken. One process by which this new image $X_R$ is generated is illustrated in FIG. 5.

Figures 5, 6:
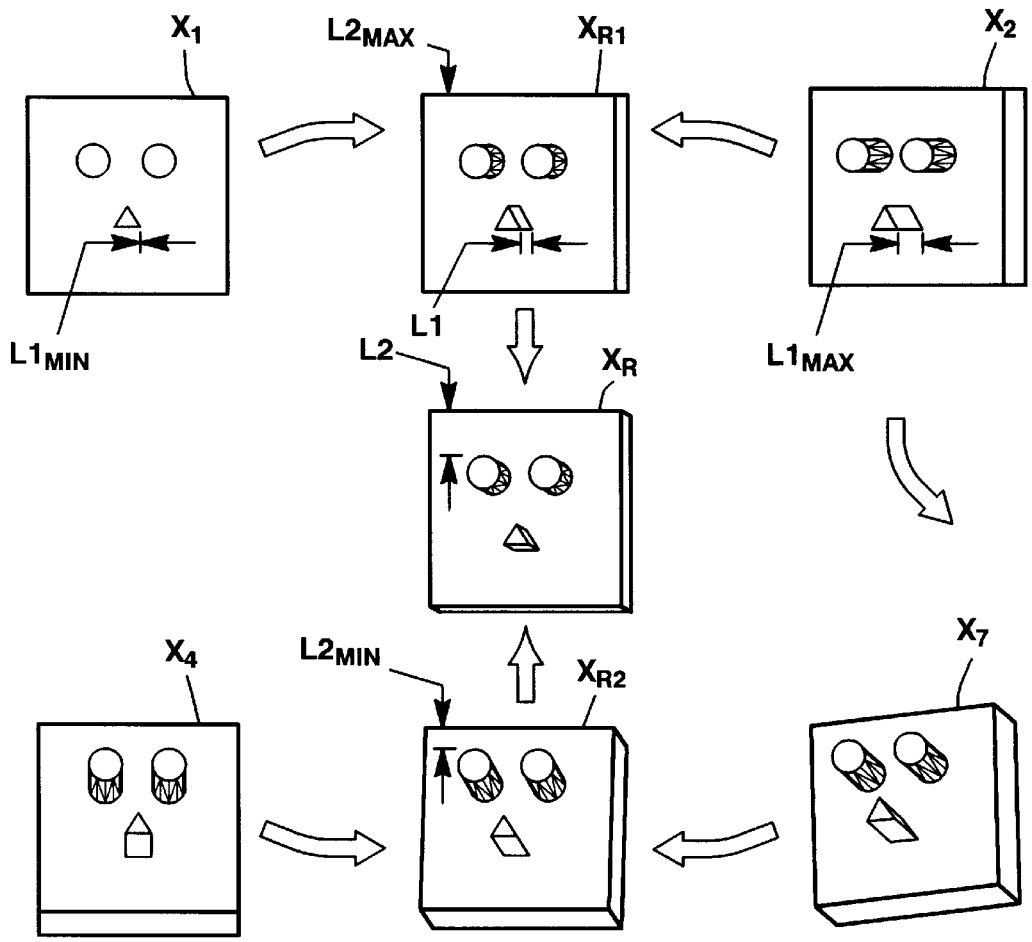
FIG. 5 shows how three rotated images are generated from a subset of the enrollment images, in a step S5 that is performed by the FIG. 1 system.
FIG. 6 shows two equations which further explain how the rotated images in FIG. 5 are generated.

Initially in the FIG. 5 process, an intermediate image $X_{R1}$ is generated and a linear interpolation of the enrollment images $X_1$ and $X_2$. Next, another intermediate image $X_{R2}$ is generated as a linear interpolation of the enrollment images $X_4$ and $X_7$. Then the final rotated image $X_R$ is generated as a linear interpolation of the two intermediate images $X_{R1}$ and $X_{R2}$.

In the intermediate image $X_{R1}$, each feature is scaled in the left-right direction. Thus each feature in image $X_{R1}$ is an intermediate form of the same feature in the two enrollment images $X_1$ and $X_2$. Similarly, in the intermediate image $X_{R2}$, each feature is scaled in the left-right direction such that it is an intermediate form of the same feature in the two enrollment images $X_4$ and $X_7$.

For example, in the intermediate image $X_{R1}$, the length L1 of the nose on the face 20 varies between a maximum length of $L1_{max}$ which occurs in the enrollment max image $X_2$, and a minimum length of zero which occurs in the enrollment image $X_1$. As the ratio $\alpha_1$ increases, the nose length L1 in the intermediate image $X_{R1}$ increases. Length L1 is given by equation 3 in FIG. 6.

In the final rotated image $X_R$, each feature is scaled in the up-down direction. Thus each feature in image $X_R$ is an intermediate form of the same feature in the two images $X_{R1}$ and $X_{R2}$. For example, in the final rotated image $X_R$, the location L2 of the top of the eye on the face 20 varies between a maximum value of $L2_{max}$ which occurs in the intermediate image $X_{R1}$, and a minimum value of $L2_{min}$ which occurs in the intermediate image $X_{R2}$. As the ratio $\alpha_2$ increases, the length L2 decreases. Length L2 is given by equation 4 in FIG. 6.

Next, in step S6, the final rotated image $X_R$ of FIG. 5 is correlated to the access image $X_i$ of FIG. 2. To perform this correlation, the pixels at each location in the final rotated image $X_R$ are subtracted from the pixels at the same location in the access image $X_i$; then the absolute value of each of those subtractions are added together; and then the resulting sum is inverted.

Next in step S7, the correlation value which is obtained by step S6 is compared to a predetermined a threshold value. If the correlation value exceeds the threshold, then the computer 10a sends a signal to the lock 10f which unlocks the door.

A primary feature of the above-described electronic system 10 is that the final rotated image $X_R$ has a higher correlation to the access image $X_i$ than any of the enrollment images $X_1$–$X_9$ which are initially stored in the system. This is evident by visually comparing the access image $X_i$ of FIG. 2 to the final rotated image $X_R$ of FIG. 5 and to all of the enrollment images of FIG. 2.

Since the correlation between the final rotated image $X_R$ and the access image $X_i$ is larger than the correlation between the access image and any of the enrollment images, the threshold value which must be exceeded in step S7 in order to gain access to the restricted area can be raised; and that in turn reduces the error rate with the FIG. 1 system operates. Conversely, if the threshold value in step S7 is lowered, then the probability of the threshold being exceeded by a person who should not be given access to the restricted area is increased.

One electronic system 10 which constitutes a preferred embodiment of the present invention, as well as its method of operation, has now been described in detail. In addition, however, various changes and modifications can be made to the details of this preferred embodiment without departing from the nature and spirit of the invention.

For example, in the embodiment of FIGS. 1–6, the system 10 was described as recognizing a human face. However, as an alternative, that system can recognize any three-dimensional object. To make this modification, the face 20 in FIG. 1 is replaced with the three-dimensional object that is to be recognized, and the various images of the face 20 as shown in FIGS. 2 and 5 are replaced with corresponding images of the three-dimensional object.

As another modification, the camera 10b in the FIG. 1 system can include any type of sensor to generate the enrollment and access images. For example, the camera 10b can generate the enrollment and access images by using a visible light sensor, or an infrared light sensor, or an x-ray sensor, or an ultrasound sensor.

Figures 7, 8:
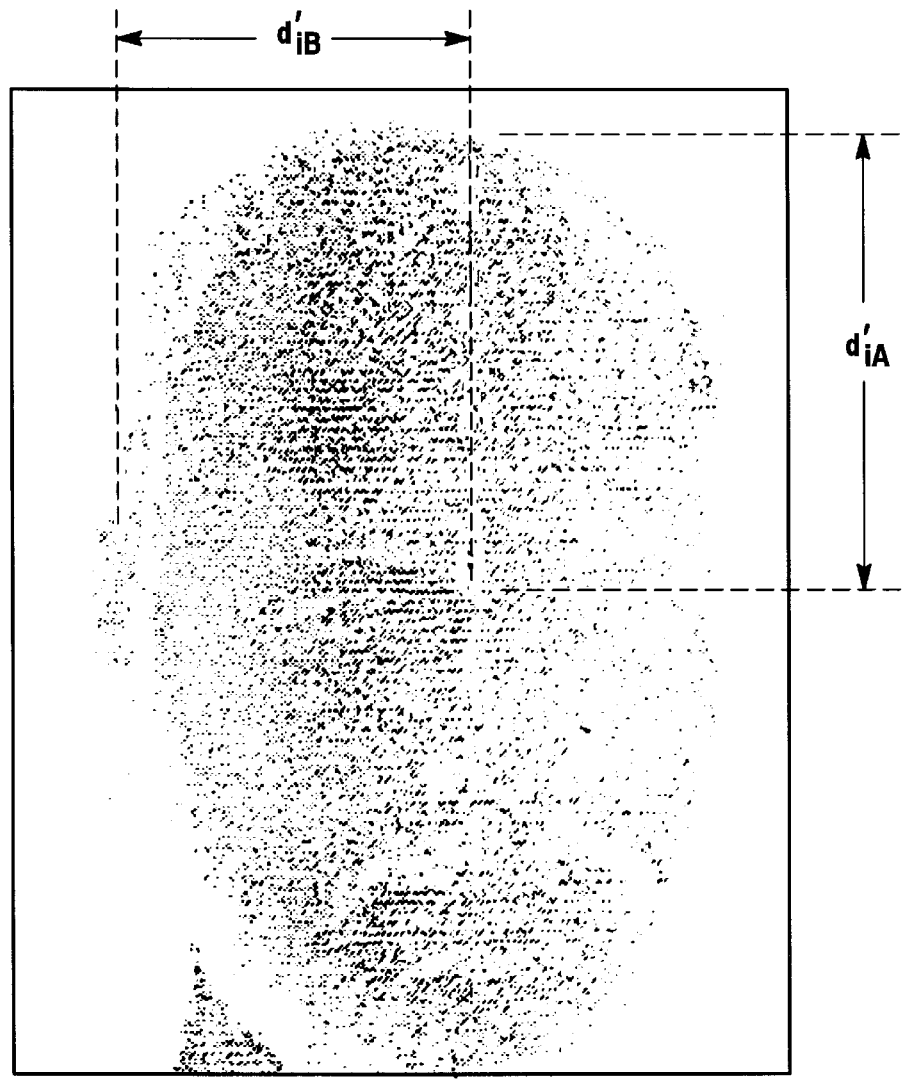
FIG. 7 shows an infrared image of a person's face which can be an access image or an enrollment image in the FIG. 1 system.
FIG. 8 shows two equations which can be used, in modifications to the FIG. 5 process, to generate the final rotated image directly from the enrollment images.

One example of an infrared image of a person's face is shown in FIG. 7; and this image can be an access image or an enrollment image in the FIG. 1 system. If the FIG. 7 image is an access image, then the distance $d_{iA}'$ as shown from the top of the face to the bridge of the nose would be measured by the step S2. This distance $d_{iA}'$ corresponds to the distance $d_{iA}$ on the access image $X_i$ in FIG. 2.

As another modification, the particular features between which distances are measured in performing steps S2 and S2' are not limited to those features which are shown in FIG. 2. For example, in the infrared image of FIG. 7, a distance $d_{iB}'$ is shown which is the distance from the side of face to the bridge of the nose; and this distance $d_{iB}'$ can be used as an alternative to the distance $d_{iB}$ as shown in FIG. 2.

Also, as another modification, the substep of entering a PIN for each person during step S1' of the enrollment phase and step S1 of the access phase can be eliminated. In that case, the set of enrollment images $X_1$–$X_n$ which is used in steps S3–S5 of the access phase is selected as the set which includes an image that has the highest correlation to the access image $X_i$.

Also, as another modification, the final rotated image $X_R$ of FIG. 5 can be generated directly from the four access images, without the steps of generating the two intermediate images $X_{R1}$ and $X_{R2}$. With this modification, the linear dimension L of any particular feature in the final rotated image $X_R$ is determined as a sum of four products 41, 42, 43, and 44, as shown by equation 5 in FIG. 8.

In equation 5, the term $L_{X1}$ is the linear dimension of any particular feature in the enrollment image $X_1$; term $L_{X2}$ is the linear dimension of the same feature in the enrollment image $X_2$; term $L_{X4}$ is the linear dimension of the same feature in the enrollment image $X_4$; term $L_{X7}$ is the linear dimension of the same feature in the enrollment image $X_7$; and term L is the interpolated dimension of the same feature in the final rotated image $X_R$. Also in equation 5, the terms a and a are the same ratios that were previously defined by equations 1 and 2 in FIG. 4.

For example, equation 5 can be used to directly determine the distance L2 between the top of the eyes and the top of the face in the final rotated image $X_R$ of FIG. 5. To do that, each of the terms $L_{X1}$, $L_{X2}$, $L_{X4}$, and $L_{X7}$ in equation 5 will have the following values: $L_{X1}=L2_{MAX}$, $L_{X2}=L2_{MAX}$, $L_{X4}=L2_{MIN}$ and $L_{X7}=L2_{MIN}$. When those values are substituted into equation 5, the result equals the equation for L2 that was previously given in FIG. 6.

Also, as another modification, the angle by which the access images $X_1$–$X_n$ differ from each other is not limited to an angle 20° as shown in FIG. 2. Instead, the angle by which the access images differ from each other preferably lies anywhere in the range of 5°–30°.

Also, as another modification, the access images need not differ from each other by the same angle. For example, access image $X_2$ can be 18° to the right with 3° upward tilt; access image $X_4$ can be 21° to the left with 21° upward tilt; and access image $X_7$ can be 22° to the right with 19° upward tilt. By using these access images in step 55, the final rotated image $X_R$ will still view the object X from a direction which approximates the direction in which access image is viewed.

Also, as another modification, four enrollment images $X_6$–$X_9$ in FIG. 2 can be eliminated; and the rotated image $X_R$ (which is correlated to the access image $X_i$) can be generated as a linear interpolation of just three of the remaining enrollment images $X_1$–$X_5$.

In the case where the access image $X_i$ is rotated up and to the right, then the rotated image $X_R$ is generated from the enrollment images $X_1$, $X_2$, and $X_4$. For this case, the linear dimension L of each feature in the rotated image $X_R$ is determined as a sum of three products 51, 52, and 53 as shown by equation 6 in FIG. 8.

For the case where the access image $X_i$ is rotated up and to the left, thus the rotated image $X_R$ is generated in the same fashion from the enrollment images $X_1$, $X_3$, and $X_4$. If the access image $X_i$ is rotated down and to the right, then the rotated image $X_R$ is generated from $X_1$, $X_2$, and $X_5$; and if the access image $X_i$ is rotated down and to the left, then the rotated image $X_R$ is generated from $X_1$, $X_3$, and $X_5$.

With this modification, less memory is needed to store the enrollment images because their total number is reduced. At the same time, the rotated image which is generated by the linear interpolation of just three enrollment images will closely resemble the rotated image that is generated by the linear interpolation of four enrollment images.

Also, as another modification, the total number of enrollment images can be reduced to four or three; and the rotated image $X_R$ can be generated as a linear interpolation of three of those images. For example, the total set of enrollment images can be $X_2$, $X_3$, $X_4$ and $X_5$ in FIG. 2, or $X_2$, $X_4$ and $X_5$ in FIG. 2 with $X_3$ be implied from $X_2$ by symmetry.

Also, as another modification, additional steps can be taken to compensate for any rotation of the access image $X_i$ in a clockwise or counter clockwise direction. For example, if the access image of FIG. 7 has a clockwise rotation, then the right eye will be closer to the top of the image than the left eye. Thus, to compensate for such a rotation, that access image can be rotated (by the FIG. 1 computer 10g) in a counter clockwise direction until both eyes are equal distances from the top of the image. Thereafter, steps S2–S7 of the access phase are performed as previously described.

Accordingly, it is to be understood that the invention is not limited to the particular details of the preferred embodiment of FIGS. 1–6, but is defined by the appended claims.

What is claimed is:

1. A method of electronically recognizing a three-dimensional object X; said method including the steps of:
   storing in a memory, a set of two-dimensional images $X_1$–$X_n$ of said object X as viewed from at least three different directions;
   acquiring a two-dimensional image of an unidentified object as viewed from a new direction which lies between said different directions;
   automatically generating, from said stored set of images, a rotated two-dimensional image of said object X as viewed from a direction which is closer to said new direction than any of said different directions; and,
   identifying said unidentified object as said object X only if a correlation between said image of said unidentified object and said rotated image exceeds a predetermined threshold.

2. A method according to claim 1 wherein said generating step includes the substeps of: measuring distances between particular features in said image of said unidentified object, and distances between the same features in one of said images $X_1$–$X_n$; and producing said rotated two-dimensional image of said object X by interpolating a subset of said images $X_1$–$X_n$ as a function of a ratio of the measured distances.

3. A method according to claim 2 wherein said object X and said unidentified object are a human face.

4. A method according to claim 3 wherein said particular features include a nose on said face, and the side of said face.

5. A method according to claim 3 wherein said particular features include a nose on said face, and the top of said face.

6. A method according to claim 3 wherein said particular features include an eye on said face, and the side of said face.

7. A method according to claim 3 wherein said particular features include an eye on said face, and the top of said face.

8. A method according to claim 3 and further including the step of enabling said unidentified object to enter a secure area only if said correlation exceeds said predetermined threshold.

9. A method according to claim 1 wherein said generating step includes the substeps of: selecting four images in said set which have the largest correlation to said image of said unidentified object; and producing said rotated two-dimensional image of said object X by interpolating the four selected images.

10. A method according to claim 1 wherein said generating step includes the substeps of: selecting three images in said set which have the largest correlation to said image of said unidentified object; and producing said rotated two-dimensional image of said object X by interpolating the three selected images.

11. A method according to claim 1 wherein said set of two-dimensional images includes a total of nine images.

12. A method according to claim 1 wherein said set of two-dimensional images includes a total of five images.

13. A method according to claim 1 wherein said directions differ from each other by less than thirty degrees.

14. A method according to claim 1 wherein said set of images of said object X and said image of said unidentified object are in the infrared frequency spectrum.

15. A method according to claim 1 wherein said set of images of said object X and said image of said unidentified object are in the visible frequency spectrum.

16. An electronic system for recognizing a three-dimensional object X; said system being comprised of:
- a memory for storing a set of two-dimensional images $X_1$–$X_n$ of said object X as viewed from at least three different directions;
- a camera for acquiring a two-dimensional image of an unidentified object as viewed from a new direction which lies between said different directions;
- an image rotating means for automatically generating from said stored set of images, a rotated two-dimensional image of said object X as viewed from a direction which is closer to said new direction than any of said different directions; and,
- a correlating means, for identifying said unidentified object as said object X only if a correlation between said image of said unidentified object and said rotated image exceeds a predetermined threshold.

* * * * *